US012410731B2

(12) United States Patent
Fulleringer et al.

(10) Patent No.: US 12,410,731 B2
(45) Date of Patent: Sep. 9, 2025

(54) LUBRICATION AND COOLING OF EQUIPMENT OF AN AIRCRAFT TURBOMACHINE

(71) Applicant: SAFRAN HELICOPTER ENGINES, Bordes (FR)

(72) Inventors: Benjamin Nicolas Fulleringer, Moissy-Cramayel (FR); Nicolas Maurice Marcel Herran, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/846,327

(22) PCT Filed: Mar. 16, 2023

(86) PCT No.: PCT/FR2023/050374
§ 371 (c)(1),
(2) Date: Sep. 12, 2024

(87) PCT Pub. No.: WO2023/175282
PCT Pub. Date: Sep. 21, 2023

(65) Prior Publication Data
US 2025/0207510 A1 Jun. 26, 2025

(30) Foreign Application Priority Data
Mar. 17, 2022 (FR) ...................................... 2202369

(51) Int. Cl.
*F01D 25/12* (2006.01)
*F01D 25/18* (2006.01)
(Continued)

(52) U.S. Cl.
CPC ........... *F01D 25/125* (2013.01); *F01D 25/18* (2013.01); *F01D 25/20* (2013.01); *F02C 7/06* (2013.01);
(Continued)

(58) Field of Classification Search
CPC ........ F01D 25/125; F01D 25/18; F01D 25/20; F02C 7/06; F16C 33/6681; F16C 33/6659;
(Continued)

(56) References Cited

U.S. PATENT DOCUMENTS 9,849,411 B2 * 12/2017 Sheridan ................. F16N 39/06

FOREIGN PATENT DOCUMENTS

EP 2 503 107 A1 9/2012
FR 3 086 326 A1 3/2020
(Continued)

OTHER PUBLICATIONS

International Search Report mailed Jun. 6, 2023, issued in corresponding International Application No. PCT/FR2023/050374, filed Mar. 16, 2023, 6 pages.
(Continued)

*Primary Examiner* — Kyle Robert Thomas
(74) *Attorney, Agent, or Firm* — CHRISTENSEN O'CONNOR JOHNSON KINDNESS PLLC

(57) ABSTRACT

An aircraft turbomachine includes a gas generator having an output shaft and a first lubricating circuit. The turbomachine further includes equipment coupled to the output shaft and including a rotor rotationally guided by at least one rolling bearing and a second lubricating circuit that is independent of the first lubricating circuit and is configured to lubricate the rolling bearing. The equipment further includes a system for cooling the rolling bearing, the cooling system being configured to circulate oil in the region of at least one ring
(Continued)

of the rolling bearing. The cooling system is independent of the second lubricating circuit and is connected to the first lubricating circuit.

15 Claims, 5 Drawing Sheets

(51) Int. Cl.
  *F01D 25/20* (2006.01)
  *F02C 7/06* (2006.01)
  *F16C 33/66* (2006.01)
  *F16C 37/00* (2006.01)

(52) U.S. Cl.
  CPC ...... *F16C 33/6659* (2013.01); *F16C 33/6681* (2013.01); *F16C 33/6685* (2013.01); *F16C 37/007* (2013.01); *F05D 2240/50* (2013.01); *F05D 2260/98* (2013.01)

(58) Field of Classification Search
  CPC ................ F16C 33/6685; F16C 37/007; F05D 2240/50; F05D 2260/98
  See application file for complete search history.

(56) References Cited

FOREIGN PATENT DOCUMENTS

FR         3 101 684 A1    4/2021
FR         3 108 935 A1    10/2021

OTHER PUBLICATIONS

Written Opinion mailed Jun. 6, 2023, issued in corresponding International Application No. PCT/FR2023/050374, filed Mar. 16, 2023, 4 pages.

\* cited by examiner

LUBRICATION AND COOLING OF EQUIPMENT OF AN AIRCRAFT TURBOMACHINE

TECHNICAL FIELD OF THE INVENTION

The present invention relates to the general field of the aeronautic. More specifically, it is aimed at an aircraft turbomachine, an equipment of which is lubricated and cooled.

TECHNICAL BACKGROUND

The technical background includes in particular the documents FR-A1-3 101 684, EP-A1-2 503 107, FR-A1-3 086 326 and FR-A1-3 108 935.

Conventionally, an aircraft turbomachine comprises a gas generator comprising at least one compressor, a combustion chamber and at least one turbine.

The gas generator generally comprises an output shaft for driving an equipment, such as a transmission box.

In this application, "equipment" means any equipment that can be coupled to the output shaft of the gas generator and comprises at least one rotor which is rotationally guided by at least one rolling bearing. A "rolling bearing" is a bearing comprising rolling elements, such as balls or rollers, typically mounted between two rings, one internal and one external.

The gas generator comprises a lubricating circuit which generally comprises an oil tank, a pump and oil pipes or nozzles. The lubricating circuit of the gas generator is used, for example, to lubricate the rolling bearings of the gas generator. It is also necessary to lubricate the guiding rolling bearing of the rotor on the equipment.

For regulatory reasons, the lubricating circuit of the gas generator cannot always be used to lubricate the equipment, which must therefore be equipped with an independent lubricating circuit. This is the case, for example, with a turbomachine for helicopters. The equipment then comprises its own lubricating circuit, which is used, for example, to lubricate the guide bearings of its rotor as well as any gear toothings.

The circulation of lubricating oil enables the heat generated by the bearings and any lubricated gears to be extracted and cooled. If the equipment malfunctions or lubrication is interrupted, the bearings are no longer cooled and can reach high temperatures that can damage them. This is all the more true when the rotor of the equipment rotates at high speeds, typically 25,000 rpm or more.

It is therefore necessary to provide a system for cooling the equipments bearings, which can ensure cooling even in the event of a malfunction in the equipments lubricating circuit.

In the current state of the art, it has already been proposed to provide oil reservoirs for lubricating the bearings during flight by means of nozzles or fog, particularly in the event of an oil shortage. However, the quantities of oil available are very small and are not sufficient to lubricate and cool the bearings, particularly those guiding the rotors at high speeds.

Emergency lubrication systems (using glycol-based oil) can be used but have the disadvantage of being heavy and cumbersome. In addition, this oil ensures the lubrication of the contacts but is still very much insufficient to cool high-speed rotors, which can reach high temperatures in case the lubrication is interrupted.

For example, on the high-speed lines of a turbomachine, a long oil interruption means that the turbomachine has to be shut down quickly to prevent a rapid failure. However, it is not always technically possible to shut down certain equipment connected to the gas generator in flight.

It has already been proposed to fit the equipment with a cooling system for its bearings. The cooling system is configured to cool the external ring of the rolling bearing only. This cooling system is currently connected to the equipment lubrication circuit, as described in the aforementioned document FR-A1-3 101 684. The cooling system allows continuous cooling of the bearing, but does not provide cooling in the event of a malfunction in the equipments lubricating circuit. The operation of the cooling system is therefore dependent on the operation of the lubricating circuit, which is problematic and does not allow safe cooling of the bearing to prevent it from overheating. This solution can also be used to cool low and medium-speed rotor guide bearings (from 400 to 20,000 rpm), but is not suitable for cooling high-speed rotors.

There is therefore a need to find a solution to ensure the cooling of the rolling bearing(s) of a rotor of the equipment, even during a malfunction of the equipments lubricating circuit.

SUMMARY OF THE INVENTION

The present invention proposes an aircraft turbomachine, this turbomachine comprising:
- a gas generator comprising at least one compressor, a combustion chamber and at least one turbine, the gas generator comprising an output shaft and a first lubricating circuit,
- an equipment coupled to the output shaft of the gas generator and comprising a rotor which is rotationally guided by at least one rolling bearing, the equipment comprising a second lubricating circuit which is independent of said first lubricating circuit and which is configured to lubricate said rolling bearing, the equipment further comprising a system for cooling said rolling bearing, the cooling system being configured to ensure a circulation of oil in the region of at least one ring of said rolling bearing, characterised in that the cooling system is independent of said second lubricating circuit and is connected to said first lubricating circuit.

In the present application, the independent circuits are defined as circuits that do not have direct fluid communication between them, i.e. the circuits are not connected to each other. There is therefore no common valve or duct between these circuits. Preferably, the circuits do not even share the same fluid tank.

Unlike the previous technique, in which the cooling system of a bearing of the equipment is independent of the lubricating circuit of the gas generator and is connected to the lubricating circuit of the equipment, the cooling system here is independent of the lubricating circuit of the equipment and is connected to the lubricating circuit of the gas generator. It is therefore understood that the bearing of the equipment can be cooled as long as the lubricating circuit of the gas generator is operational. The operation of the cooling of the bearing of the equipment is therefore independent of the operation of the lubricating circuit of the equipment. Even if the lubricating circuit of the equipment malfunctions, the cooling system of the bearing of the equipment can continue to be supplied with oil and cool the bearing of the equipment.

The cooling system is configured to ensure the cooling of the guide bearing(s) of the rotors, even when the latter is rotating at high speeds of 25,000 rpm or more. The configuration of the cooling system is not constrained by the capacities of the second lubricating circuit and benefits from the capacities of the first lubricating circuit, the capacities of the first circuit generally being greater than those of the second circuit. Capacities are defined in particular as the flow rate and volume of oil available for cooling.

The equipment within the meaning of the invention is preferably selected from an electrical machine, a gear or speed box, a speed reduction gear and a transmission box. For example, it can be a speed reduction gear of the RGB type (Reduction GearBox), a transmission box of the BTP or BTI type (Boîte de Transmission Principale or Intermédiaire), or a propulsion speed box of the PGB type (Propeller GearBox).

The turbomachine may comprise one or more of the following characteristics, taken alone or in combination with each other.
- the cooling system is configured to ensure a circulation of oil in the region of an external ring of said rolling bearing;
- the cooling system is a permanent cooling system and is configured to ensure a continuous circulation of oil in the region of the ring(s) of said rolling bearing;
- the cooling system is a safety cooling system and is configured to be activated to ensure oil circulation in the region of the ring(s) of said rolling bearing;
- the cooling system is connected to an activation system selected from an electrical system, a thermostatic system and a hot-melt system;
- the cooling system comprises pipes formed in an external casing of the equipment;
- the pipes comprise at least one cooling pipe extending around the ring(s) of the rolling bearing, said at least one cooling pipe being connected both to at least one feed oil pipe from the first lubricating circuit and to at least one oil return pipe to the first lubricating circuit;
- the external ring of said rolling bearing is integrated into said casing or is mounted in said casing;
- said casing is fixed to the gas generator,
- the equipment is chosen from an electrical machine, a gear or speed box, a speed reduction gear and a transmission box;
- said or each ring of the bearing is made of a metal alloy or ceramic;
- each of said first and second lubricating circuits comprises a dedicated oil tank and/or a dedicated pump;
- the oil tank of the second lubricating circuit is a gravity tank;
- the pump of the second lubricating circuit is configured to supply oil nozzles and to fill the gravity tank.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
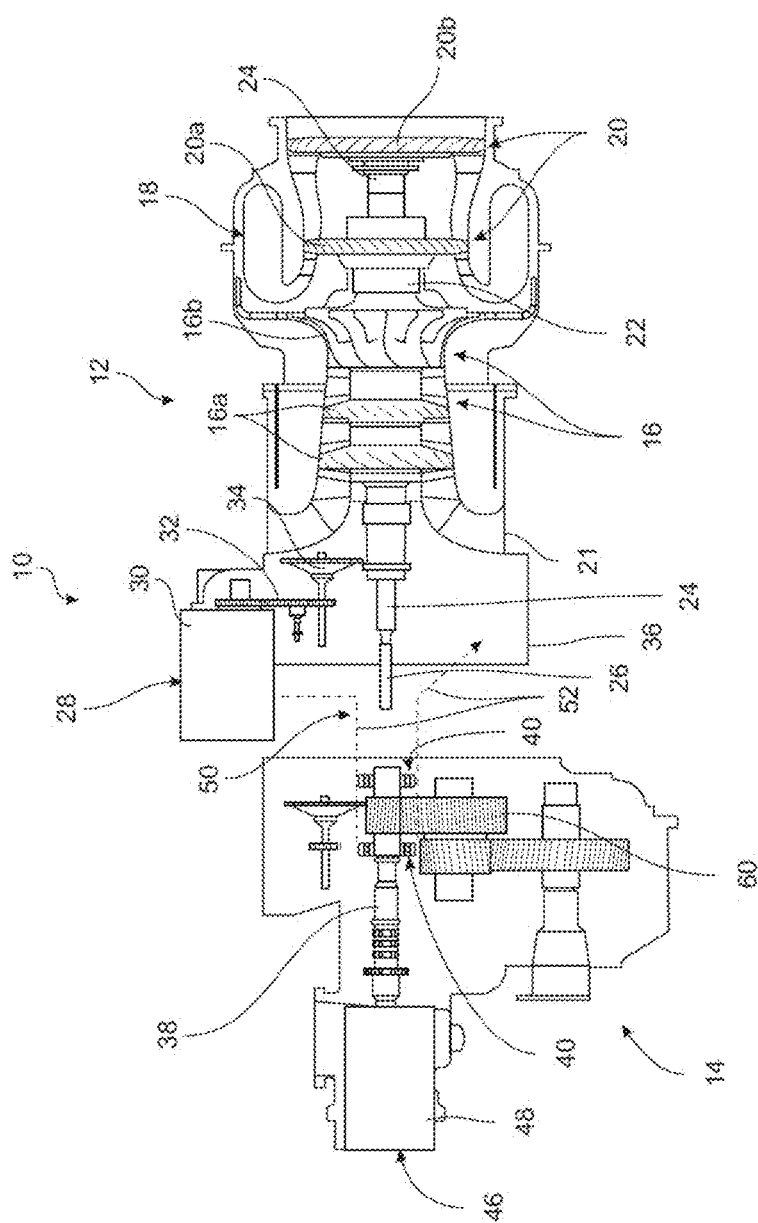
FIG. 1 is a schematic axial sectional view of an aircraft turbomachine, and in particular of a gas generator and an equipment of this turbomachine.

FIG. 1 shows a turbomachine 10 for an aircraft, in particular a helicopter. The turbomachine 10 essentially comprises two parts or modules, namely a gas generator 12, on the right of the drawing, and an equipment 14, on the left of the drawing.

The gas generator 12 conventionally comprises, from upstream to downstream (from left to right in the drawing), with reference to the flow of gases, one or more compressors 16, a combustion chamber 18 and one or more turbines 20.

The gas generator 12 comprises an air inlet 21, in this case annular, which supplies air to the compressors 16. In the example shown, the gas generator 12 comprises an axial compressor 16a with two compression stages followed by a centrifugal compressor 16b. The air is compressed in the compressors 16, mixed with fuel and burnt in the combustion chamber 18. The combustion gases leaving the chamber 18 feed a first turbine 20a, the rotor of which is connected by a common shaft 22 to the rotor of the compressors 16. The combustion gases are expanded in the first turbine 20a and then in a free turbine 20b, the shaft 24 of which extends coaxially inside the shaft 22, as far as the upstream end of the gas generator 10. The shaft 24 comprises an upstream end which is located outside the gas generator 10 and forms an output shaft 26 intended to be coupled to the equipment 14.

The gas generator 12 comprises a lubricating circuit 28, in particular for the rolling bearings (not shown) guiding the shafts 24 and 22. This lubricating circuit 28 comprises, for example, a tank, a pump 30 and oil nozzles on the rolling bearings. The pump 30 is, for example, a pump comprising a rotor connected by a gear 32 to a power sampling device 34 on the shaft 22.

The lubricating circuit 28 of the gas generator 12 is located in the gas generator 12 and in particular inside an external casing 36 of the gas generator.

The equipment 14 is preferably selected from an electrical machine, a gear or speed box, a speed reduction gear and a transmission box. For example, it can be a speed reduction gear of the RGB type (Reduction GearBox), a transmission box of the BTP or BTI type (Main or Intermediate GearBox), or a propulsion speed box of the PGB type (Propeller GearBox).

The equipment 14 comprises a rotor 38 which is coupled, for example by splines, to the output shaft 26 of the gas generator 12. The rotor 38 is rotationally guided by one or more rolling bearings 40, which can be seen more clearly in FIG. 2. The rotor 38 comprises, for example, external helical toothing 42 located between two external cylindrical surfaces 44. The bearings 40 are located respectively on the two surfaces 44 and comprise internal rings 40a mounted on these surfaces 44 and secured in rotation with the rotor 38. The bearings 40 also comprise external rings 40b supported by a stator and rolling elements 40c arranged between the internal and external rings. The rings 40a, 40b of the bearings 40 are typically made of a metal alloy or ceramic. The equipment 14 comprises a lubricating circuit 46, in particular for rolling bearings 40. This lubricating circuit 46 comprises, for example, a tank, a pump 48 and oil nozzles on the rolling bearings 40. The pump 48 is, for example, a pump comprising a rotor coupled to one end of the rotor 38.

The turbomachine 10 also comprises a system 50 for cooling the rolling bearings 40 and in particular their external rings 40b. This cooling system 50 is independent of the lubricating circuit 46, i.e. it is not connected to this circuit 46, and is instead connected to the lubricating circuit 28 of the gas generator 12.

The cooling system 50 is configured to ensure an oil circulation at the external rings 40b of the rolling bearings 40.

Figure 2:
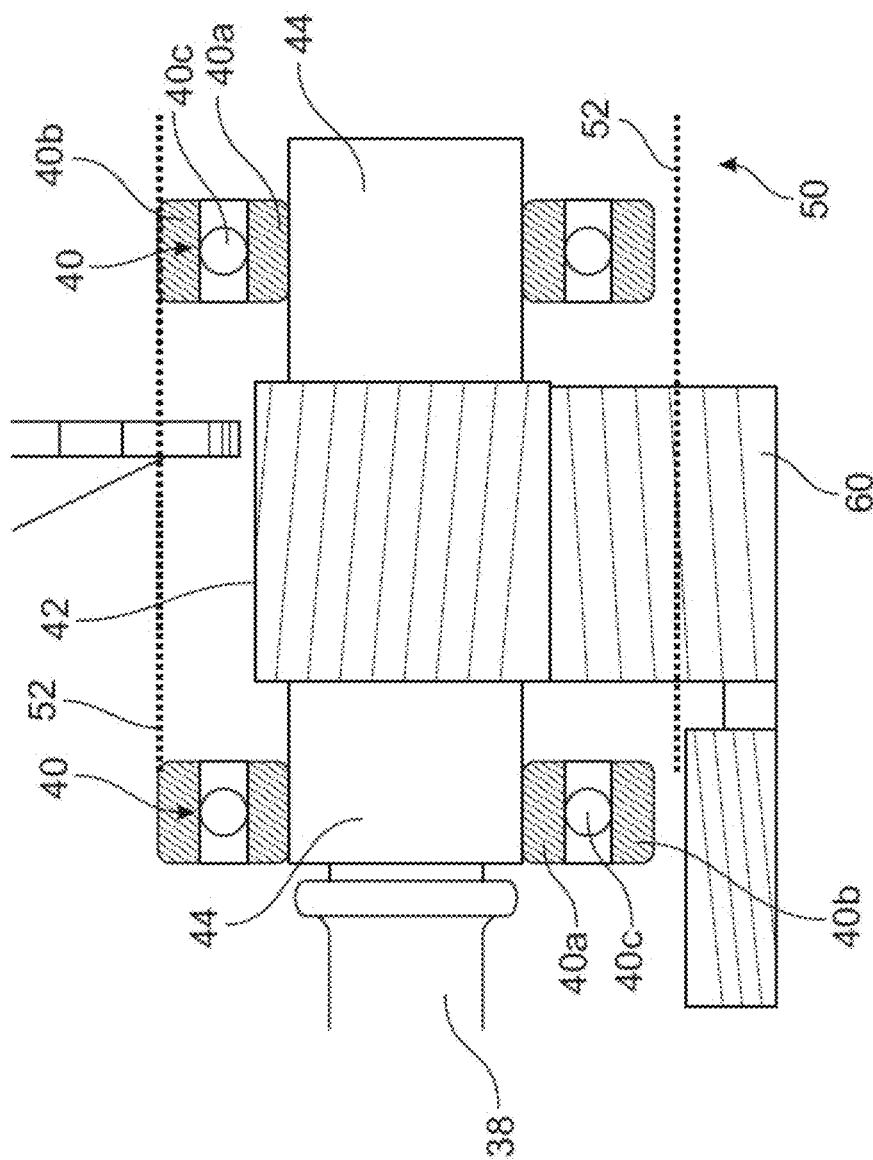
FIG. 2 is a larger-scale view of part of FIG. 1 and shows a rotor of the equipment guided by rolling bearings.

FIGS. 1 and 2 show very schematically the pipes 52 (in the form of dotted lines) which supply oil from the lubrication circuit 28 to the bearings 40, as well as discharging this oil which can be re-injected into the lubricating circuit 28.

Figure 3:
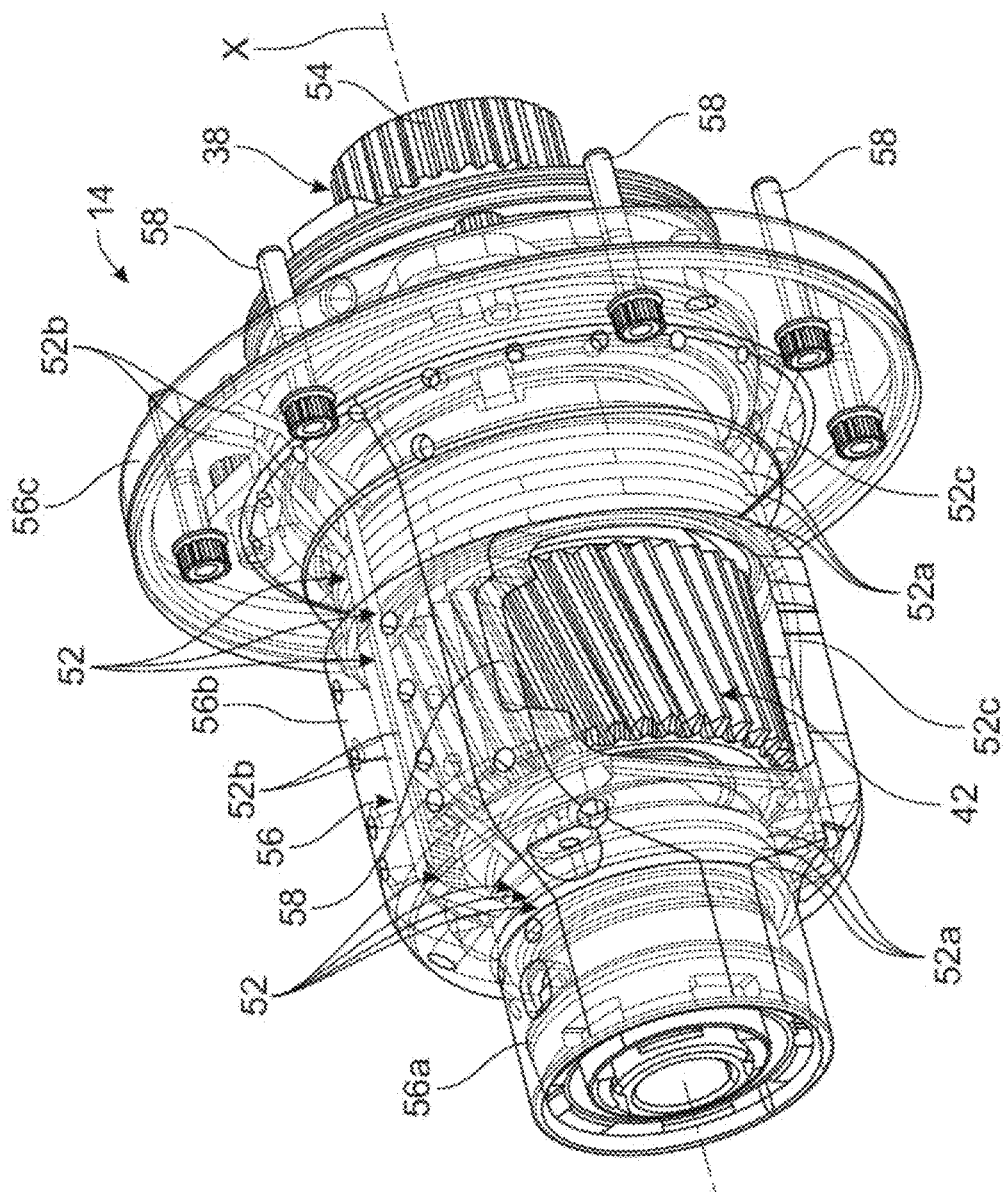
FIG. 3 is a perspective view of part of an equipment intended to be coupled to an output shaft of a gas generator, and shows a system for cooling the guide bearings of its rotor.
Figure 4:
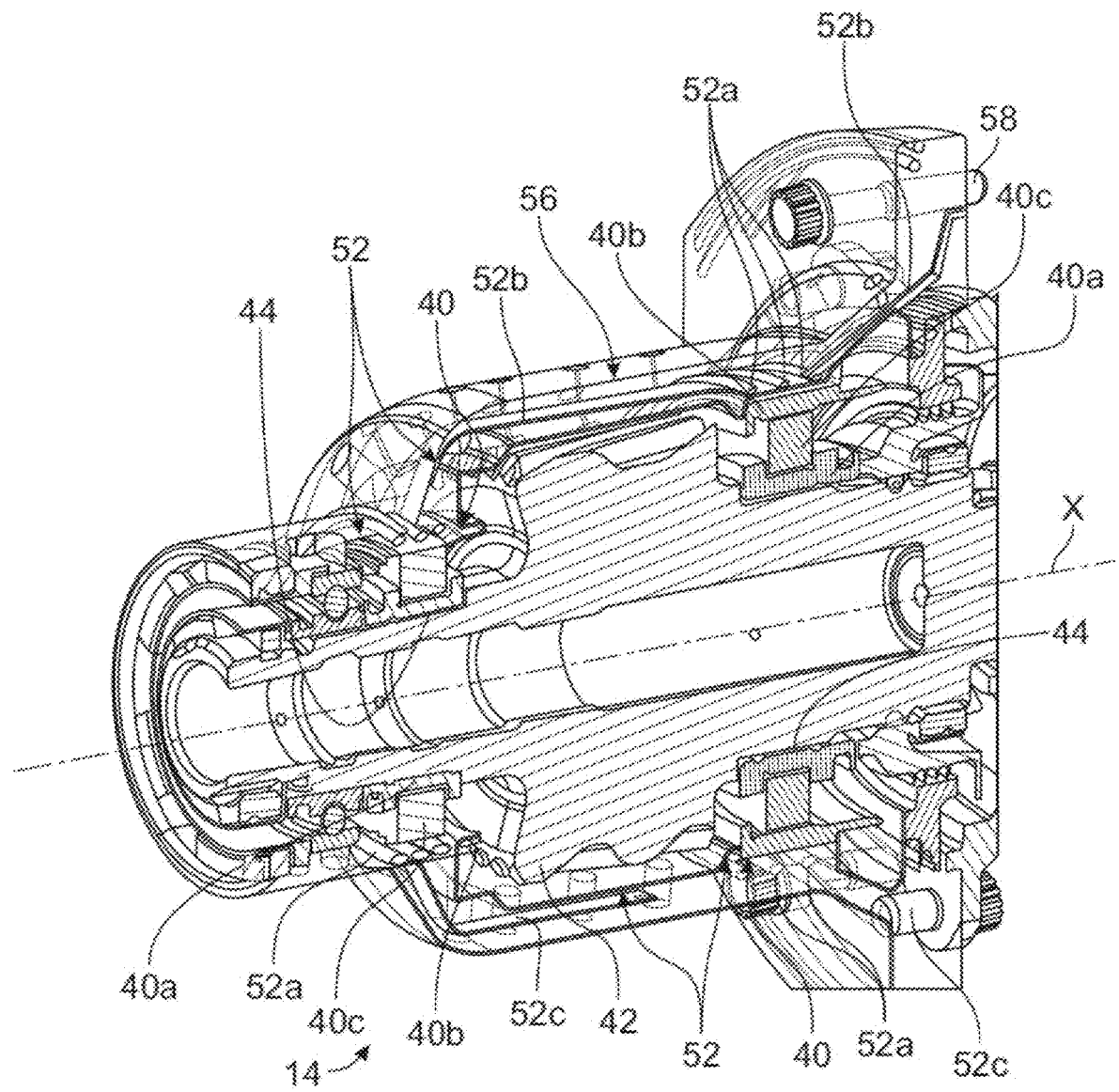
FIG. 4 is a schematic view of the equipment part in perspective and axial section of the FIG. 3.

FIGS. 3 and 4 show a more concrete embodiment of the invention. The rotor 38 of the equipment 14 comprises external splines 54 at one end for coupling to the output shaft 26 (which comprises complementary internal splines). The rotor 38 also comprises the toothing 42 and the surfaces 44 on which the internal rings 40a of the bearings 40 are mounted. FIG. 4 shows that one of the bearings 40, on the left of the drawing, is ball bearing and its external ring 40b is integrated into a casing 54 of the equipment 14. The other bearing 40, on the right of the drawing, has rollers and its external ring 40b is mounted in the casing 56 of the equipment 14. The casing 56 thus forms a cage or support for the bearings 40.

The aforementioned pipes 52 of the cooling system 50 are formed in the casing 56. This casing 56 has a general shape of revolution about the axis X of rotation of the rotor 38. The casing 56 conforms to the general shape of the rotor 38 and comprises, for example, two adjacent cylindrical portions 56a, 56b and an external radially annular flange 56c.

The annular flange 56c is located at an axial end of the casing 56, on the side of the splines 54 of the rotor 38, and is configured to be fixed to the casing 36 of the gas generator 12, and for example to a corresponding annular flange of the gas generator. To achieve this, the flange 56c comprises an annular row of orifices for the passage of screws 58 fixed to the casing 36 of the gas generator 12.

The cylindrical portion 56b of larger diameter extends around the toothing 42 and the surface 44 receiving the ball bearing 40, and from the flange 56c to the cylindrical portion 56a of smaller diameter. This portion 56a extends around the surface 44 receiving the ball bearing 40.

The cylindrical portion 56b comprises a slit 58 which exposes part of the toothing 42 and enables it to mesh with a pinion 60 or other equipment (see FIGS. 1 and 2).

Among the pipes 52 of the cooling system 50, there are pipes 52a which have a generally annular shape and extend around the external rings 40b, when the latter are fitted in the casing 56, or in the external rings 40b, when the latter are integrated in the casing 56.

The main function of the pipes 52a is to circulate cooling oil as close as possible to the bearings 40 in order to cool them. There may be one, two, three or more annular pipes 52a around each of the bearings 40. These pipes 52a each have the same overall dimensions and in particular the same diameters measured in relation to the axis X.

The pipes 52 also comprise feed oil pipes 52b formed in the casing 56. Each of these pipes 52b is connected to one or more of the pipes 52a and comprises an end which opens at the flange 56c to be fluidly connected to a corresponding end of the lubricating circuit 28 of the gas generator 12. The lubricating circuit 28 of the gas generator 12 may also comprise an end which opens onto the flange of its casing 36 so that the assembly and fixing of the flanges ensures fluid communication between the lubrication circuit 28 and the cooling system 50.

The pipes 52 also comprise oil discharge pipes 52c which are formed in the casing 56. Each of these pipes 52c is connected to one or more of the pipes 52a and comprises an end which opens at the level of the flange 56c to be fluidly connected to a corresponding end of the lubrication circuit 28, in the same way as the pipes 52b.

Alternatively, the cooling system 50 could be configured to cool the internal rings 40a of the bearings 40 only, or the external 40b and internal rings 40a of the bearings 40.

Generally speaking, the pipes 52 of the cooling system 50 can have any general shape and for example a serpentine or zigzag shape, and with any cross-sectional shape and for example round, oval, etc.

The casing 56 shown in the drawings can be produced by additive manufacturing, although this is not restrictive.

In one embodiment, the cooling system 50 can be configured to ensure continuous oil circulation at the level of the rings 40b of the bearings 40.

Alternatively, the cooling system 50 is a safety cooling system and is configured to be activated to ensure oil circulation at the level of the rings 40b of the bearings 40. The cooling system 50 then has two distinct states: a first deactivated state in which there is no circulation of oil in the pipes 52 and therefore no cooling of the bearings 40 by heat exchange with the oil, and a second activated state in which the oil circulates in the pipes 52 to cool the bearings 40.

The cooling system 50 is then connected to an activation system selected from an electrical system, a thermostatic system and a hot-melt system. This activation system comprises, for example, one or more solenoid valves placed in the circuit and controlled by an electrical, thermostatic or hot-melt element. The solenoid valve can be designed to be activated manually or automatically. A pilot of the aircraft can, for example, control the system to be activated when a light in the cockpit signals an anomaly, this light relating, for example, to the oil pressure in the lubricating circuit 46 of the equipment 14. The activation system can be associated with a temperature sensor to monitor the temperature of the bearings and activate the cooling system when this temperature exceeds a predetermined threshold.

Figure 5:
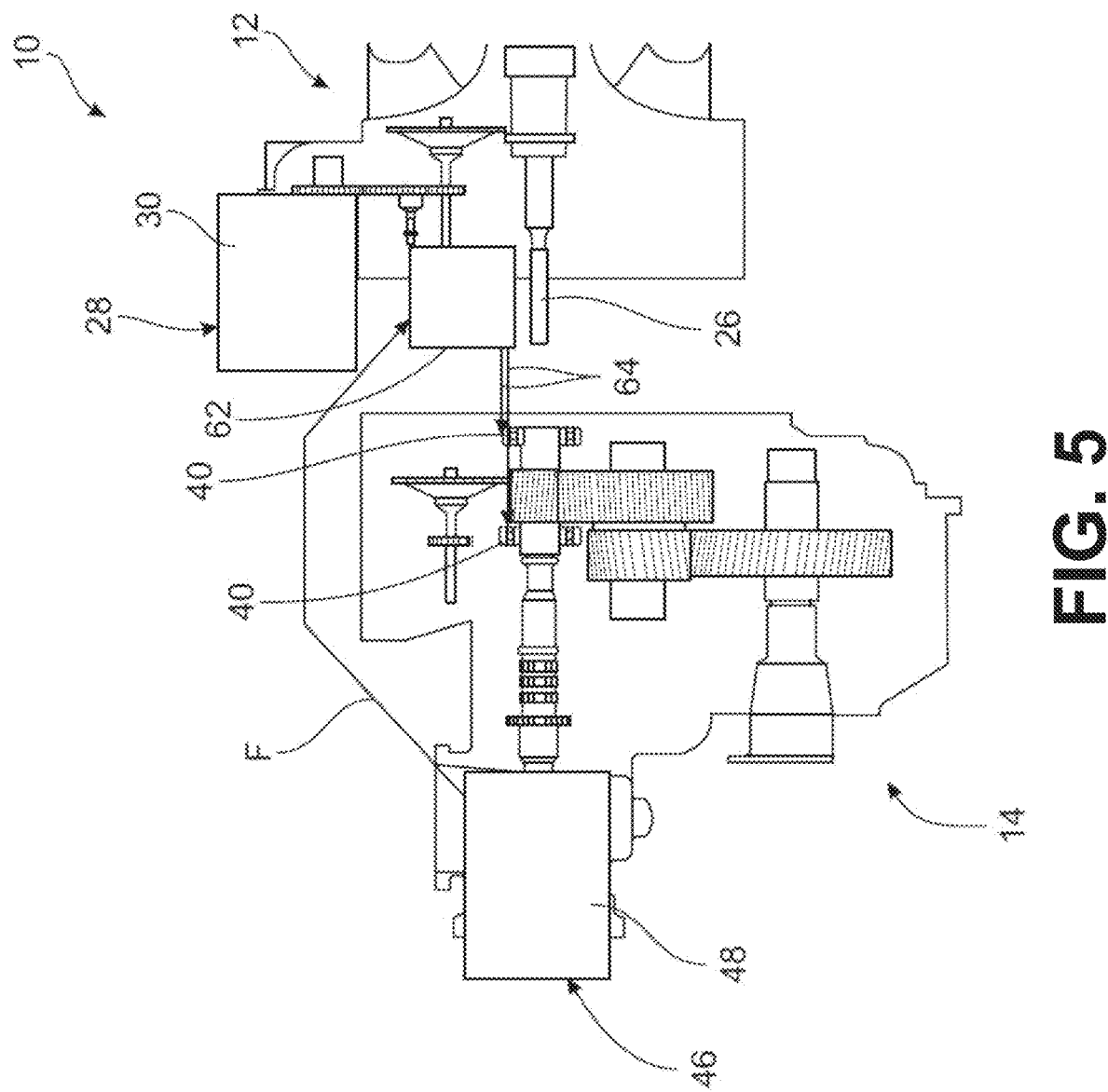
FIG. 5 is a partial schematic view of an axial cross-section of an aircraft turbomachine, similar to FIG. 1, and shows an alternative embodiment of the invention.

FIG. 5 shows another embodiment of the invention in which the lubricating circuit 46 of the equipment 14 comprises a gravity tank 62, i.e. a tank from which oil flows by gravity to the bearings 40 in particular. Once this oil has lubricated the bearings, it is recovered and can be returned to the gravity tank 62 using the pump 48 in the circuit 46 (see arrow F). This pump 48 can also be used to supply oil nozzles to the bearings 40 and to other elements to be lubricated on the equipment 14. The oil supplied by the gravity tank 62 can then be used to lubricate the bearings 40 in parallel, in addition to the main lubrication provided by the oil nozzles (connected to the tank 62 or to another tank in the circuit 46). The embodiment shown in FIG. 5 also comprises a cooling system 50 as described above.

As can be seen in the example shown, the gravity tank 62 can be mounted in the gas generator 12 and in particular in its casing 36. It is then connected to bearing lubrication means by one or more pipes 64, which comprise a top end connected to the tank 62 and a bottom end connected to these lubrication means for the gravitational flow of oil from the tank 62 to the bearings 40.

The invention thus proposes to convey lubricating oil from the gas generator 12 into the equipment 14 to cool the bearings 40 of this equipment. The heat generated by the bearings is then removed by the lubricating oil, which is then cooled in the gas generator 12.

The invention claimed is:

1. An aircraft turbomachine, comprising:
   a gas generator comprising at least one compressor, a combustion chamber, and at least one turbine, the gas generator comprising an output shaft and a first lubricating circuit, and
   an equipment coupled to the output shaft of the gas generator and comprising a rotor which is rotationally guided by at least one rolling bearing, the equipment comprising a second lubricating circuit which is independent of said first lubricating circuit and which is configured to lubricate said at least one rolling bearing, the equipment further comprising a system for cooling configured to cool said at least one rolling bearing, the cooling system being configured to ensure a circulation of oil in the region of at least one ring of said at least one rolling bearing,
   wherein the cooling system is independent of said second lubricating circuit and is connected to said first lubricating circuit.

2. The turbomachine according to claim 1, wherein the cooling system is configured to ensure a circulation of oil in the region of an external ring of said at least one rolling bearing.

3. The turbomachine according to claim 1, wherein the cooling system is a permanent cooling system and is configured to ensure a continuous circulation of oil in the region of the ring(s) of said at least one rolling bearing.

4. The turbomachine according to claim 1, wherein the cooling system is a safety cooling system and is configured to be activated to ensure a circulation of oil in the region of the ring(s) of said at least one rolling bearing.

5. The turbomachine according to claim 4, wherein the cooling system is connected to an activation system which is chosen from an electrical system, a thermostatic system, and a hot-melt system.

6. The turbomachine according to claim 1, wherein the cooling system comprises pipes formed in an external casing of the equipment.

7. The turbomachine according to claim 6, wherein the pipes comprise at least one cooling pipe extending around the ring(s) of the at least one rolling bearing, said at least one cooling pipe being connected both to at least one feed oil pipe from the first lubricating circuit, and to at least one oil return pipe to the first lubricating circuit.

8. The turbomachine according claim 2, wherein the cooling system comprises pipes formed in an external casing of the equipment, and the external ring of said at least one rolling bearing is integrated into said casing or is mounted in said casing.

9. The turbomachine according to claim 6, wherein said casing is fixed to the gas generator.

10. The turbomachine according to claim 1, wherein the equipment is chosen from an electrical machine, a gear or speed box, a speed reduction gear, and a transmission box.

11. The turbomachine according to claim 1, wherein said or each ring of said at least one rolling bearing is made of a metal alloy or ceramic.

12. The turbomachine according to claim 1, wherein each of said first and second lubricating circuits comprises a dedicated oil tank.

13. The turbomachine according to claim 12, wherein the oil tank of the second lubricating circuit is a gravity tank.

14. The turbomachine according to claim 1, wherein each of said first and second lubricating circuits comprises a dedicated pump.

15. The turbomachine according claim 13, wherein each of said first and second lubricating circuits comprises a dedicated pump, and the pump of the second lubricating circuit is configured to supply oil nozzles and to fill the gravity tank.

* * * * *